US008028830B1

(12) United States Patent
Nematollahi et al.

(10) Patent No.: US 8,028,830 B1
(45) Date of Patent: Oct. 4, 2011

(54) ANTI-BALLISTIC COMPOSITE STRUCTURE FOR ORDINANCE

(75) Inventors: Khosrow Nematollahi, Carmel, IN (US); Brian Ream, Clay City, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1098 days.

(21) Appl. No.: 11/653,480

(22) Filed: Jan. 11, 2007

Related U.S. Application Data

(60) Provisional application No. 60/762,561, filed on Jan. 13, 2006.

(51) Int. Cl.
*B32B 15/04* (2006.01)
(52) U.S. Cl. .................. 206/317; 89/36.17; 102/331
(58) Field of Classification Search .............. 206/3, 317, 206/524.2, 524.3; 102/303, 324, 331, 516; 89/36.02, 36.17
See application file for complete search history.

(56) References Cited

U.S. PATENT DOCUMENTS

| 4,027,601 | A | * | 6/1977 | Hickerson | 109/1 R |
|---|---|---|---|---|---|
| 4,432,285 | A | * | 2/1984 | Boyars et al. | 206/3 |
| 4,440,296 | A | * | 4/1984 | Howe et al. | 206/3 |
| 4,586,602 | A | * | 5/1986 | Levey | 206/3 |
| 5,221,807 | A | * | 6/1993 | Vives | 89/36.11 |
| 6,341,708 | B1 | * | 1/2002 | Palley et al. | 206/3 |
| 6,347,700 | B1 | * | 2/2002 | Redfield et al. | 206/3 |
| 6,497,966 | B2 | * | 12/2002 | Cohen | 89/36.02 |
| 7,204,183 | B2 | * | 4/2007 | Cirillo | 206/3 |
| 2008/0171166 | A1 | * | 7/2008 | Nematollahi | 428/35.9 |

FOREIGN PATENT DOCUMENTS

EP 1046878 A1 * 10/2000

* cited by examiner

*Primary Examiner* — J. Gregory Pickett
*Assistant Examiner* — Robert Poon
(74) *Attorney, Agent, or Firm* — Christopher A. Monsey

(57) ABSTRACT

A structure is disclosed to protect explosive ordnance. The structure comprises an inner ceramic layer. A polyurethane layer encompassing the inner ceramic layer. A third layer is a stainless steel layer encompassing the polyurethane layer with a second polyurethane layer wrapping around the stainless steel layer. A fifth layer is an outer ceramic layer. A sixth layer through tenth layer comprises interconnected aramid fiber fabric (i.e., KEVLAR) impregnated with polyurethane. The structure may be part of an explosive handling system to include a shipping container that decelerates projectiles approaching the explosive device. The container comprises fifteen additional layers to encompass the structure. The first layer is steel encompassing the structure with a second layer through fifteenth layer of the container each being KEVLAR impregnated with polyurethane. Both the composite structure and the shipping container can be made from commercially available products.

2 Claims, 4 Drawing Sheets

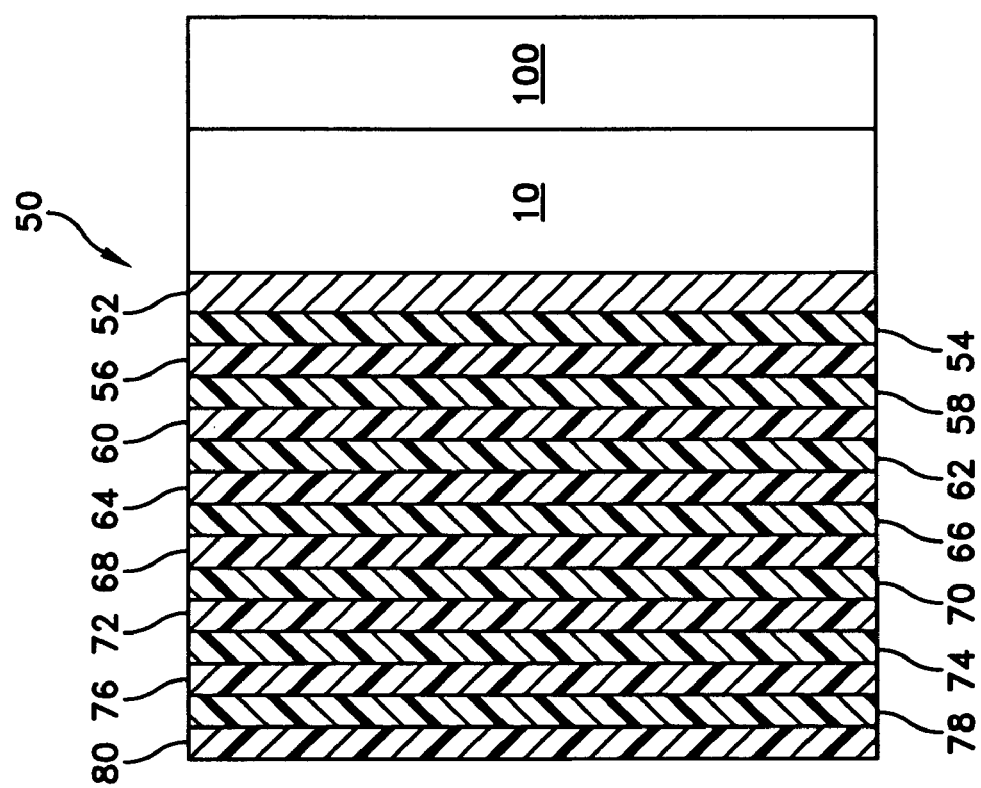

ANTI-BALLISTIC COMPOSITE STRUCTURE FOR ORDNANCE

This invention claims the benefit of U.S. Provisional Application No. 60/762,561 filed Jan. 13, 2006 and which is entitled ANTI-BALLISTIC COMPOSITE STRUCTURE FOR ORDNANCE by Khosrow Nematollahi and Brian Ream.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to an explosive ordnance handling and transport system and more particularly to a composite structure and shipping container that is ballistic-resistant and protects the ordnance.

(2) Description of the Prior Art

Recently, there has been an emphasis on compliance with Insensitive Munitions (IM) standards as part of an effort to improve the safety of explosives and energetic materials. Military products are manufactured, shipped and stored at various locations throughout the world. The increasing threat of terrorist attacks on military installations and public infrastructure has driven all branches of the military to assess the safety of existing ordnance handling and transport systems and products under their area of responsibility.

Tests that address the various threats to explosive ordnance transport include the impact of bullets on the Insensitive Munitions, fragment impact, slow cook-off, fast cook-off, and sympathetic detonation. IM compliance and hazard classification testing addresses the safety of the product relative to transportation, storage, and system vulnerability over the entire life cycle of the product.

The bullet impact test is considered the most difficult to pass with the Insensitive Munitions because of the severity of the test. More particularly, one aspect of Insensitive Munitions compliance is to assess the reaction of the device relative to the standard attack threat of a 0.50 caliber M2 armor-piercing bullet.

As such, a need exists to improve the IM compliance for handling of explosive ordnance and energetic material especially ballistic-resistance to M2 armor-piercing bullets.

SUMMARY OF THE INVENTION

Accordingly, it is a primary object and general purpose of the present invention to provide a composite structure that improves IM compliance for explosive ordnance and energetic material.

It is a further object of the present invention to provide a composite structure that is ballistic-resistant to armor-piercing bullets.

It is a still further object of the present invention to provide a composite structure that maintains a comparatively safer environment for the transportation, handling and storage of explosive and ordnance energetic materials.

It is a still further object of the present invention to provide a comparatively thin and lightweight anti-ballistic composite structure.

It is a still further object of the present invention to provide a comparatively thin and lightweight and anti-ballistic composite structure capable of stopping a 0.50 caliber armor-piercing bullet.

In order to attain the objects described above, there is provided a composite structure that can be used in conjunction with a similarly designed shipping container to protect explosive ordnance or an explosive device. The composite structure comprises a first inner ceramic layer with a first polyurethane layer encompassing the inner ceramic layer. A third layer is a 316L stainless steel layer encompassing the first polyurethane layer. A fourth layer is a second polyurethane layer encompassing the stainless steel layer. A fifth layer is an outer ceramic layer and a sixth layer through a tenth layer comprises five layers of interconnected aramid fiber fabric (i.e., Kevlar® available from DuPont) impregnated with polyurethane.

Since the explosive ordnance is typically transported inside a shipping container, the composite structure may be part of an explosive handling system to include a complimentary-designed shipping container. In design, the shipping container comprises additional layers to encompass the composite structure. A first layer of the shipping container is made of steel encompassing the composite structure.

A second layer through a fifteenth layer of the shipping container is each KEVLAR_in which each layer is impregnated with polyurethane. Both the composite structure and the shipping container can be made from commercially available off-the-shelf products, known to those skilled in the art.

The application of the composite structure of the present invention can result in cost savings for shipping, tracking and logistics. With minor modifications recognizable by those skilled in the art, the technology of the composite structure of the present invention can be customized for other weapon systems requiring Insensitive Munitions (IM) compliance.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein:

FIG. 4 depicts a cross-section of a shipping container of the present invention with the view taken along reference line 4-4 of FIG. 3 and with the view of the layers of the composite structure removed in order to more clearly depict the layers of the shipping container.

DETAILED DESCRIPTION OF THE INVENTION

Figure 1:
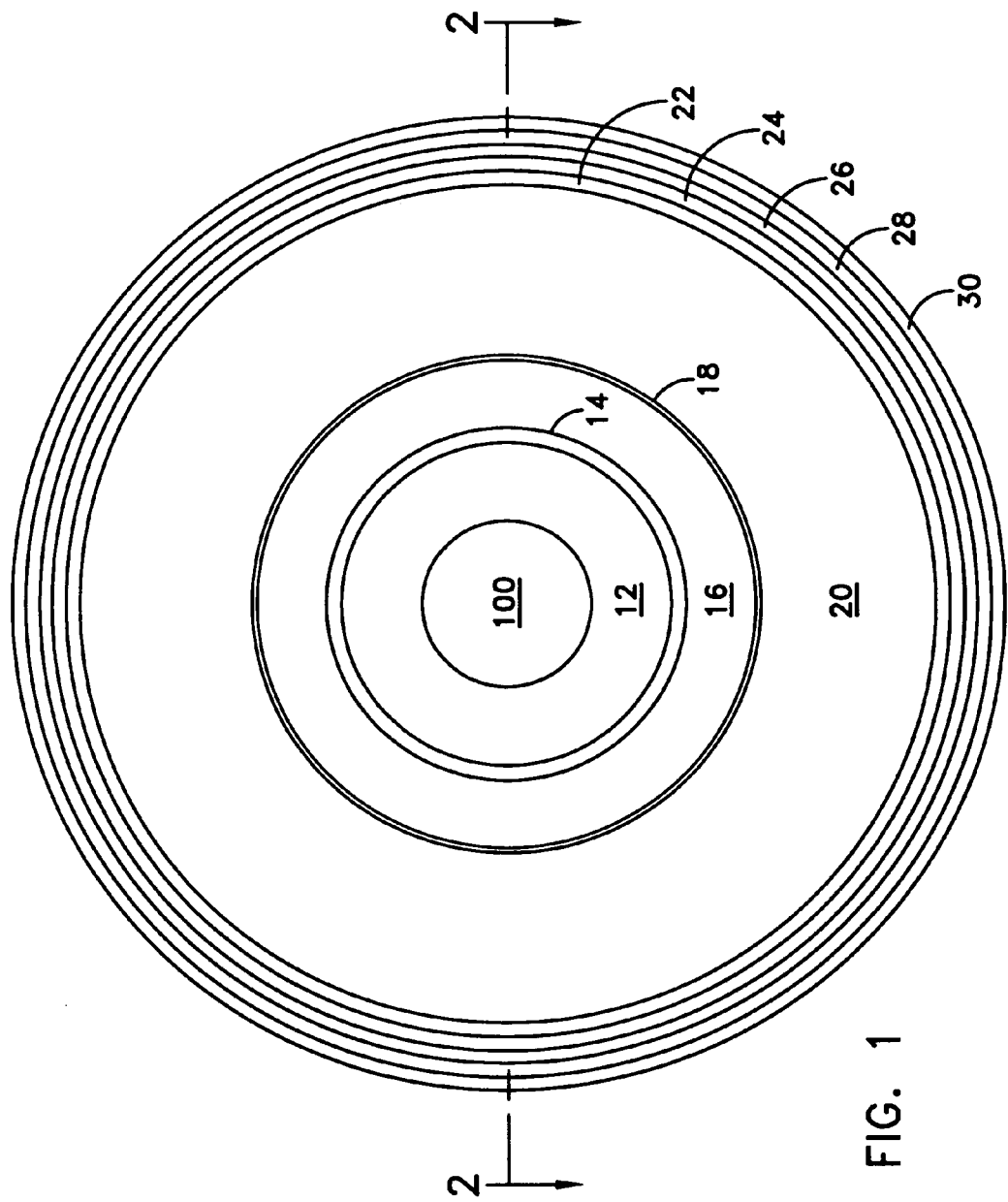
FIG. 1 depicts a plan view of the composite structure of the present invention with the composite structure protecting explosive ordnance.

Referring now to the drawings, and more particularly to FIG. 1, a composite structure 10 is shown that is used to protect explosive ordnance or a device 100. The composite structure 10, shown in the figures, generally comprises concentric cylindrical layers of ceramic, polyurethane, stainless steel, and interconnected aramid fiber fabric layers (i.e., Kevlar® available from DuPont). The composite structure may be other shapes than cylindrical with minor modifications recognizable by those ordinarily skilled in the art.

Figure 2:
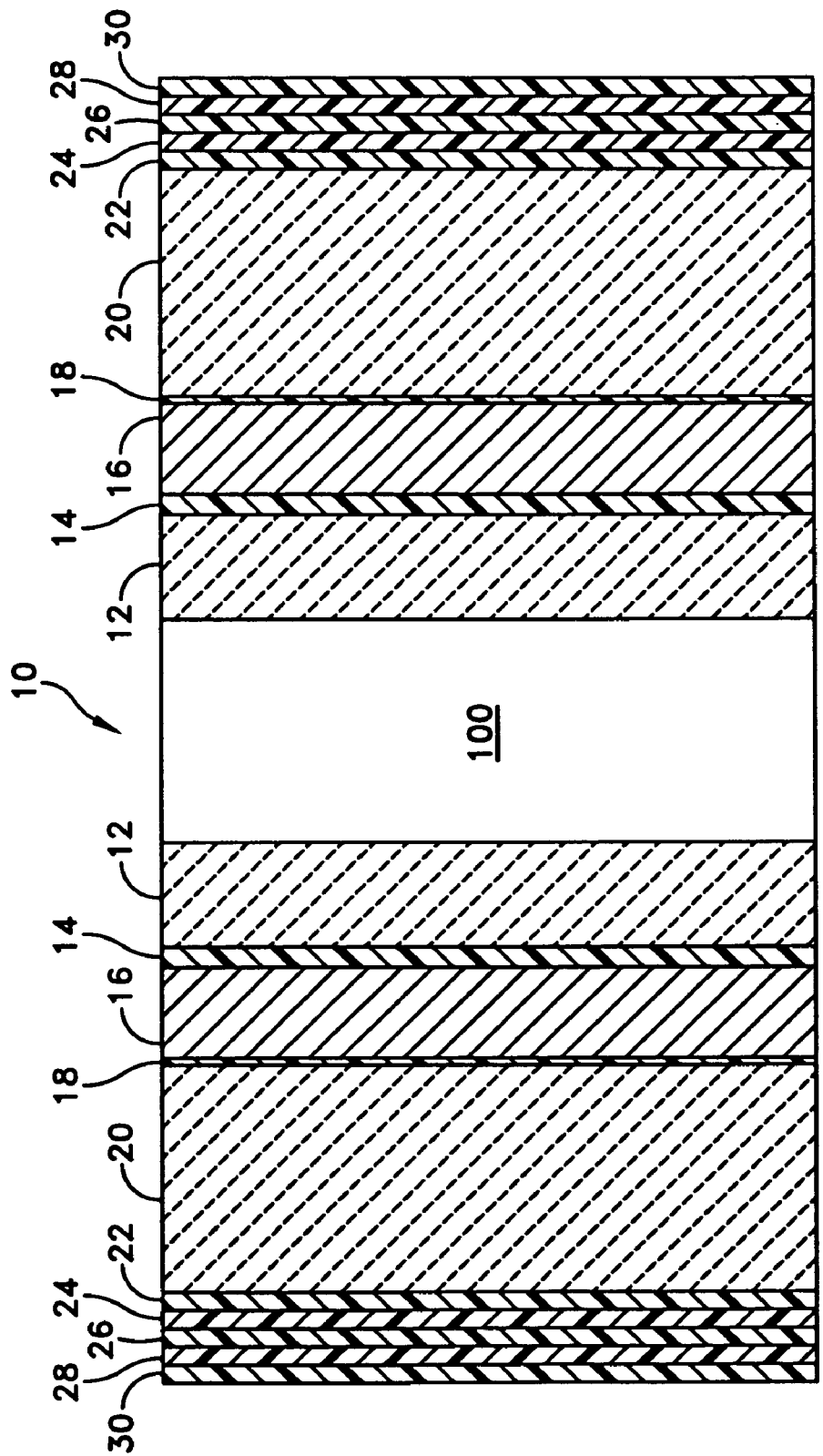
FIG. 2 depicts a cross-section of a composite structure of the present invention and with the view taken along reference line 2-2 of FIG. 1.
Figure 3:
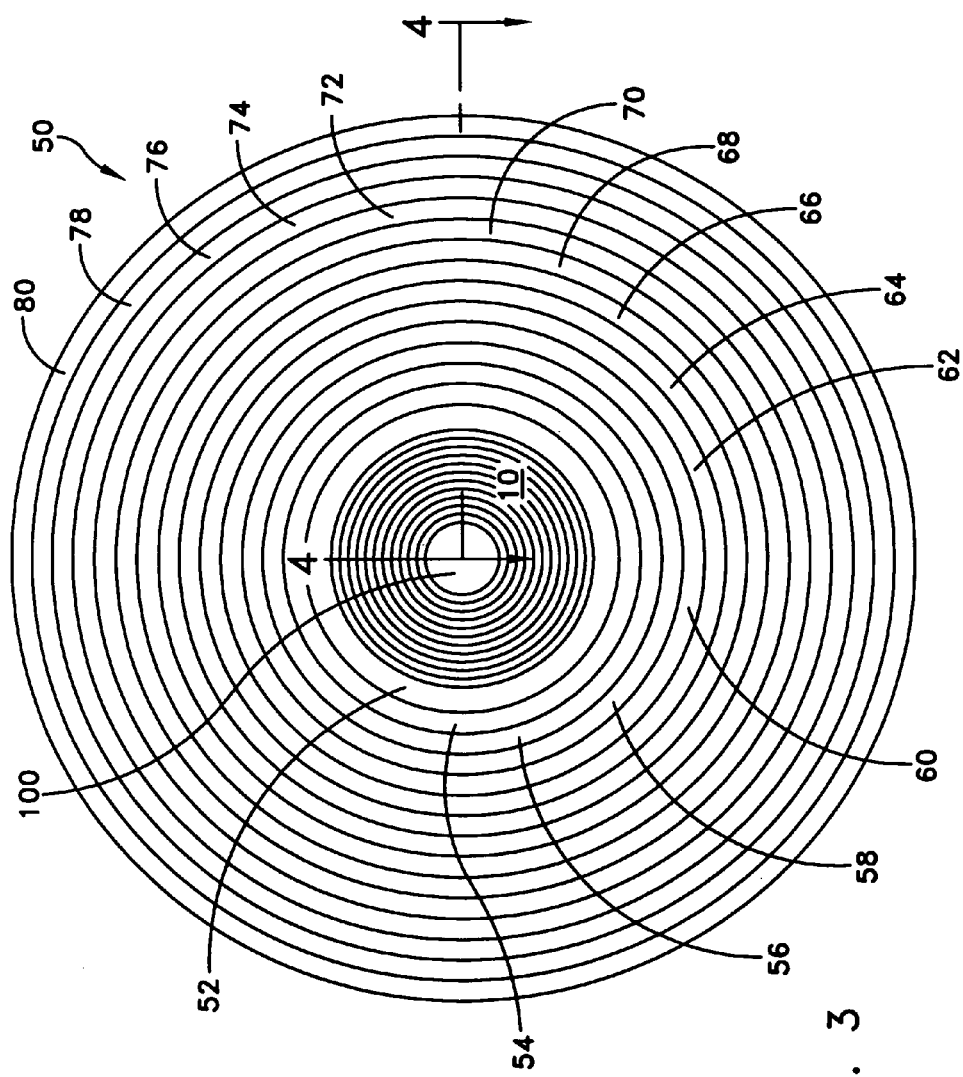
FIG. 3 depicts an plan view of a shipping container surrounding the composite structure of the present invention with the view of the layers of the composite structure minimized in order to more clearly depict the layers of the shipping container.

As shown in the cross-sectional view of FIG. 2, a first layer is an inner ceramic layer 12 with a thickness of at least 0.46 inches. The inner ceramic layer 12 is preferably ninety percent high-density alumina. In a cylindrical form, the inner ceramic layer 12 preferably has an inside diameter (ID) of 3.25 inches; however, a nominal dimension of 3.0 inches ID and a 4.0 inch outside diameter (OD) with a tolerance of ±1/16 inches can be used for the inner ceramic layer.

A second layer is a first polyurethane layer 14 encompassing the inner ceramic layer 12. The first polyurethane layer 14 has a thickness of at least 0.09 inches and is preferably a polyether based, polyurethane resin (i.e., Conathane EN-1556® available from Cytec Industries Inc.); however, suitable and commercially-available materials known to those skilled in the art may be substituted.

A third layer is a 316L stainless steel layer 16 with a thickness of at least 0.40 inches. The stainless steel layer 16 encompasses the first polyurethane layer 14. In a cylindrical form, the stainless steel layer 16 preferably has an inside diameter of 4.10 inches and an outside diameter of 4.90 inches.

A fourth layer is a second polyurethane layer 18 encompassing the stainless steel layer 16 with a thickness of at least 0.03 inches. The second polyurethane layer 18 is preferably CONATHANE EN-1556 polyurethane.

A fifth layer is a second or outer ceramic layer 20 of preferably ninety percent high-density alumina with a thickness of at least 1.00 inch. In a cylindrical form, the second ceramic layer 20 preferably has an ID of 4.96 inches; however, a nominal dimension of 5.0 inches ID and 7.0 inches O.D. with a tolerance of ±1/16 inch can be used for the outer or second ceramic layer.

A sixth layer through a tenth layer comprises five layers of KEVLAR fabric impregnated with polyurethane. The sixth through tenth layers are KEVLAR/polyurethane layers 22, 24, 26 and 30. The thickness of each of the layers is at least 0.08 inches. Five layers of KEVLAR fabric with polyurethane are the least amount of layers that can be applied; however, additional layers of KEVLAR with polyurethane may be used.

Since the explosive ordnance 100 is typically transported inside a shipping container, the composite structure 10 may be part of an explosive handling system to include a complimentary-designed shipping container 50. The role of the shipping container 50 is to decelerate a bullet by about twenty-five percent and to decelerate any other projectiles approaching the explosive device 100. In design, the shipping container 50 comprises additional layers to encompass the composite structure 10.

A first layer 52 of the shipping container 50 is made of steel with a thickness of approximately 0.10 inches. The first layer 52 encompasses the composite structure 10. In a cylindrical form, the first layer 52 of steel preferably has an ID of 10.5 inches.

A second layer 54 through a fifteenth layer 80 of the shipping container 50 (including a third layer 56, a fourth layer 58, a fifth layer 60, a sixth layer 62, a seventh layer 64, an eighth layer 66, a ninth layer 68, a tenth layer 70, an eleventh layer 72, a twelfth layer 74, a thirteenth layer 76 and a fourteenth layer 78 are each KEVLAR fabric in which each layer is impregnated with polyurethane. Each of the layers 54 through 80 has a thickness of 0.08 inches with a total thickness of 1.20 inches. Both the composite structure 10 and the shipping container 50 can be made from commercially available off-the-shelf products, known to those skilled in the art.

The composite structure 10 and the shipping container 50, whether alone or in combination, provide an effective, thin and lightweight and anti-ballistic or ballistic-resistant structure for the protection of explosive ordnance or devices.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A composite structure and container assembly for protection of an explosive ordnance device, comprising:
   a composite structure including:
      an inner ceramic layer of approximately ninety-percent high-density alumina positionable to encompass the explosive ordnance, said inner ceramic layer having a thickness of at least 0.46 inches;
      a first polyurethane layer encompassing said inner ceramic layer, said first polyurethane layer having a thickness of at least 0.09 inches;
      a stainless steel layer encompassing said first polyurethane layer, said stainless steel layer having a thickness of at least 0.40 inches;
      a second polyurethane layer encompassing said stainless steel layer, said second polyurethane layer having a thickness of at least 0.03 inches;
      an outer ceramic layer of approximately ninety-percent high-density alumina encompassing said second polyurethane layer, said outer ceramic layer having a thickness of at least one inch;
      a first layer of interconnected aramid fiber fabric impregnated with polyurethane with a thickness of 0.08 inches encompassing said outer ceramic layer;
      a second layer of interconnected aramid fiber fabric impregnated with polyurethane with a thickness of 0.08 inches encompassing said first layer of interconnected aramid fiber fabric;
      a third layer of interconnected aramid fiber fabric impregnated with polyurethane with a thickness of 0.08 inches encompassing said second layer of interconnected aramid fiber fabric;
      a fourth layer of interconnected aramid fiber fabric impregnated with polyurethane with a thickness of 0.08 inches encompassing said third layer of interconnected aramid fiber fabric; and
      a fifth layer of interconnected aramid fiber fabric impregnated with polyurethane with a thickness of 0.08 inches encompassing said fourth layer of interconnected aramid fiber fabric;
      at least one additional layer of interconnected aramid fiber fabric impregnated with polyurethane encompassing said fifth layer of interconnected aramid fiber fabric; and
   a container including:
      a first layer of steel capable of encompassing said composite structure;
      a first layer of interconnected aramid fiber fabric of said container, said first layer impregnated with polyurethane and with a thickness of 0.08 inches encompassing said first layer of steel;
a second layer of interconnected aramid fiber fabric of said container, said second layer impregnated with polyurethane and with a thickness of 0.08 inches encompassing said first layer of interconnected aramid fiber fabric of said container;
a third layer of interconnected aramid fiber fabric of said container, said third layer impregnated with polyurethane and with a thickness of 0.08 inches encompassing said second layer of interconnected aramid fiber fabric of said container;
a fourth layer of interconnected aramid fiber fabric of said container, said fourth layer impregnated with polyurethane and with a thickness of 0.08 inches encompassing said third layer of interconnected aramid fiber fabric of said container;
a fifth layer of interconnected aramid fiber fabric of said container, said fifth layer impregnated with polyurethane and with a thickness of 0.08 inches encompassing said fourth layer of interconnected aramid fiber fabric of said container;
a sixth layer of interconnected aramid fiber fabric of said container, said sixth layer impregnated with polyurethane and with a thickness of 0.08 inches encompassing said fifth layer of interconnected aramid fiber fabric of said container;
a seventh layer of interconnected aramid fiber fabric of said container, said seventh layer impregnated with polyurethane and with a thickness of 0.08 inches encompassing said sixth layer of interconnected aramid fiber fabric of said container;
an eighth layer of interconnected aramid fiber fabric of said container, said eighth layer impregnated with polyurethane and with a thickness of 0.08 inches encompassing said seventh layer of interconnected aramid fiber fabric of said container;
a ninth layer of interconnected aramid fiber fabric of said container, said ninth layer impregnated with polyurethane and with a thickness of 0.08 inches encompassing said eighth layer of interconnected aramid fiber fabric of said container;
a tenth layer of interconnected aramid fiber fabric of said container, said tenth layer impregnated with polyurethane and with a thickness of 0.08 inches encompassing said ninth layer of interconnected aramid fiber;
an eleventh layer of interconnected aramid fiber fabric of said container, said eleventh layer impregnated with polyurethane and with a thickness of 0.08 inches encompassing said tenth layer of interconnected aramid fiber fabric of said container;
a twelfth layer of interconnected aramid fiber fabric of said container, said twelfth layer impregnated with polyurethane and with a thickness of 0.08 inches encompassing said eleventh layer of interconnected aramid fiber fabric of said container;
a thirteenth layer of interconnected aramid fiber fabric of said container, said thirteenth layer impregnated with polyurethane and with a thickness of 0.08 inches encompassing said twelfth layer of interconnected aramid fiber fabric of said container; and
a fourteenth layer of interconnected aramid fiber fabric of said container, said fourteenth layer impregnated with polyurethane and with a thickness of 0.08 inches encompassing said thirteenth layer of interconnected aramid fiber fabric of said container.

2. A composite structure and container assembly for protection of an explosive ordnance device, comprising:
a composite structure including:
an inner ceramic layer of approximately ninety-percent high-density alumina positionable to encompass the explosive ordnance, said inner ceramic layer having a thickness of at least 0.46 inches;
a first polyurethane layer encompassing said inner ceramic layer, said first polyurethane layer having a thickness of at least 0.09 inches;
a stainless steel layer encompassing said first polyurethane layer, said stainless steel layer having a thickness of at least 0.40 inches;
a second polyurethane layer encompassing said stainless steel layer, said second polyurethane layer having a thickness of at least 0.03 inches;
an outer ceramic layer of approximately ninety-percent high-density alumina encompassing said second polyurethane layer, said outer ceramic layer having a thickness of at least one inch;
a first layer of interconnected aramid fiber fabric impregnated with polyurethane with a thickness of 0.08 inches encompassing said outer ceramic layer;
a second layer of interconnected aramid fiber fabric impregnated with polyurethane with a thickness of 0.08 inches encompassing said first layer of interconnected aramid fiber fabric;
a third layer of interconnected aramid fiber fabric impregnated with polyurethane with a thickness of 0.08 inches encompassing said second layer of interconnected aramid fiber fabric;
a fourth layer of interconnected aramid fiber fabric impregnated with polyurethane with a thickness of 0.08 inches encompassing said third layer of interconnected aramid fiber fabric; and
a fifth layer of interconnected aramid fiber fabric impregnated with polyurethane with a thickness of 0.08 inches encompassing said fourth layer of interconnected aramid fiber fabric; and
a container including:
a first layer of steel capable of encompassing said composite structure;
a first layer of interconnected aramid fiber fabric of said container, said first layer impregnated with polyurethane and with a thickness of 0.08 inches encompassing said first layer of steel;
a second layer of interconnected aramid fiber fabric of said container, said second layer impregnated with polyurethane and with a thickness of 0.08 inches encompassing said first layer of interconnected aramid fiber fabric of said container;
a third layer of interconnected aramid fiber fabric of said container, said third layer impregnated with polyurethane and with a thickness of 0.08 inches encompassing said second layer of interconnected aramid fiber fabric of said container;
a fourth layer of interconnected aramid fiber fabric of said container, said fourth layer impregnated with polyurethane and with a thickness of 0.08 inches encompassing said third layer of interconnected aramid fiber fabric of said container;
a fifth layer of interconnected aramid fiber fabric of said container, said fifth layer impregnated with polyurethane and with a thickness of 0.08 inches encompassing said fourth layer of interconnected aramid fiber fabric of said container;

a sixth layer of interconnected aramid fiber fabric of said container, said sixth layer impregnated with polyurethane and with a thickness of 0.08 inches encompassing said fifth layer of interconnected aramid fiber fabric of said container;

a seventh layer of interconnected aramid fiber fabric of said container, said seventh layer impregnated with polyurethane and with a thickness of 0.08 inches encompassing said sixth layer of interconnected aramid fiber fabric of said container;

an eighth layer of interconnected aramid fiber fabric of said container, said eighth layer impregnated with polyurethane and with a thickness of 0.08 inches encompassing said seventh layer of interconnected aramid fiber fabric of said container;

a ninth layer of interconnected aramid fiber fabric of said container, said ninth layer impregnated with polyurethane and with a thickness of 0.08 inches encompassing said eighth layer of interconnected aramid fiber fabric of said container;

a tenth layer of interconnected aramid fiber fabric of said container, said tenth layer impregnated with polyurethane and with a thickness of 0.08 inches encompassing said ninth layer of interconnected aramid fiber;

an eleventh layer of interconnected aramid fiber fabric of said container, said eleventh layer impregnated with polyurethane and with a thickness of 0.08 inches encompassing said tenth layer of interconnected aramid fiber fabric of said container;

a twelfth layer of interconnected aramid fiber fabric of said container, said twelfth layer impregnated with polyurethane and with a thickness of 0.08 inches encompassing said eleventh layer of interconnected aramid fiber fabric of said container;

a thirteenth layer of interconnected aramid fiber fabric of said container, said thirteenth layer impregnated with polyurethane and with a thickness of 0.08 inches encompassing said twelfth layer of interconnected aramid fiber fabric of said container; and a fourteenth layer of interconnected aramid fiber fabric of said container, said fourteenth layer impregnated with polyurethane and with a thickness of 0.08 inches encompassing said thirteenth layer of interconnected aramid fiber fabric of said container.

\* \* \* \* \*